United States Patent [19]
Matsumoto et al.

[11] Patent Number: 6,060,536
[45] Date of Patent: May 9, 2000

[54] METHOD OF PRODUCING WET FRICTION MATERIAL AND WET FRICTIONAL MATERIAL

[75] Inventors: Takayuki Matsumoto; Shigeki Umezawa, both of Shizuoka, Japan

[73] Assignee: NSK-Warner Kabushiki Kaisha, Tokyo, Japan

[21] Appl. No.: 08/897,823

[22] Filed: Jul. 21, 1997

Related U.S. Application Data

[63] Continuation-in-part of application No. 08/582,980, Jan. 4, 1996, abandoned.

[30] Foreign Application Priority Data

Jan. 5, 1995 [JP] Japan .......................... P.HEI. 7-15504

[51] Int. Cl.$^7$ ................................ C08J 5/14; B05D 5/00
[52] U.S. Cl. .......................... 523/156; 523/149; 523/153; 523/157; 427/288
[58] Field of Search ..................................... 523/149, 153, 523/156, 157; 427/288

[56] References Cited

U.S. PATENT DOCUMENTS

| | | | |
|---|---|---|---|
| 5,083,650 | 1/1992 | Seiz et al. | 523/156 |
| 5,268,398 | 12/1993 | Nakagawa et al. | 523/153 |
| 5,292,780 | 3/1994 | Godfrey et al. | 523/152 |
| 5,395,864 | 3/1995 | Miyoshi et al. | 523/155 |
| 5,453,317 | 9/1995 | Yesnik | 523/149 |

*Primary Examiner*—Tae Yoon
*Attorney, Agent, or Firm*—Sughrue, Mion, Zinn, Macpeak & Seas, PLLC

[57] ABSTRACT

In a method of producing a wet friction material according to the present invention, a water soluble material is dispersed into a raw paper including a fibrous base material, a filler, and a friction adjusting agent. Then, the raw paper is passed through water to dissolve the water soluble material to provide porosity. Thereafter, the raw paper is immersed with thermosetting resin, and heated and hardened to thereby produce a wet friction material.

7 Claims, 3 Drawing Sheets

METHOD OF PRODUCING WET FRICTION MATERIAL AND WET FRICTIONAL MATERIAL

This application is a continuation-in-part application of Ser. No. 08/582,980 filed on Jan. 4, 1996, now abandoned.

BACKGROUND OF THE INVENTION

1. Field of the Invention

The present invention relates to a method of producing a wet friction material to be used for a clutch, a brake, or the like in a wet frictional engagement device.

2. Description of the Related Art

FIG. 1 shows an example of the configuration of a clutch which is a wet frictional engagement device. In the drawing, torque is transmitted through pressure engagement between a driving plate 2 fitted to a spline portion 51 of a hub 5 inserted in an input shaft 6 and a driven plate 1 fitted to a spline portion 41 of a retainer 4. The reference numerals 3 and 7 designate a pressure plate and a pressing piston respectively.

Such a frictional engagement device is required to be reduced in size and weight, small in operation shock, and large in torque capacity, in view of the energy and environmental problems and the like.

Further, the frictional engagement device is required to cope with the high energy requirement with the promote of high rotational speed and output of an automobile engine, the requirement being extremely high.

In the conventional frictional engagement device, lubricating oil containing an additive for decreasing the coefficient of friction is apt to be much used in order to reduce an operational shock. Therefore, if the frictional engagement device is reduced in size and weight, the torque capacity of the device becomes low inevitably. Since the pressing force is therefore increased to increase the torque capacity, the separation life of a wet friction material is reduced, a heat spot or thermal deformation is caused in an opposite frictional surface (a driven surface), surface temperature rising is caused with the prolongation of the sliding time due to reduction of the coefficient of friction, and a fade phenomenon is generated with the advance hardening of the friction material due to thermally decomposed materials of thermosetting resin.

Further, in order to make the heat-resisting property of a friction material high in the conventional art, it is necessary to make the voids high. That is, the friction material is made porous and lubricating oil is normally contained in the friction material, so that the oil discharged from the inside with compression of the friction material acts to remove the heat generated at the time of pressure engagement.

In order to provide porosity, if the entanglement between fibrous base materials is weakened to obtain high voids (porosity) in the beginning of production of a friction material, however, the mechanical strength of the friction material is reduced. Therefore, there is a limit in the design of production of a porous friction material. Accordingly, there arises a problem that an action to absorb oil into the friction material at the time of releasing of the friction material and to discharge the oil at the time of pressure engagement of the friction material, that is, a so-called sponge effect, is made high so that the heat-resisting life of the friction material is prolonged, while the mechanical to strength is prevented from lowering.

SUMMARY OF THE INVENTION

It is an object of the present invention to provide a method of producing wet friction material capable of producing a wet friction material in which a so-called sponge effect is made high so that he heat-resisting life of the friction material is prolonged, while the mechanical strength is prevented from lowered, and a wet frictional material produced by the method.

A method of producing a wet friction material according to the present invention is comprised of: dispersing a water soluble material into a wet friction material including a fibrous base material, a filler, a friction adjusting agent and a thermosetting resin; and passing the wet friction material through water to dissolve the water soluble material to provide porosity. Further, a wet frictional material according to the present invention is produced by this method.

According to the present invention, it is possible to obtain a method of producing a wet friction material with porosity so as to increase the heat-resisting property and the durability without reducing the mechanical strength of the friction material.

BRIEF DESCRIPTION OF THE DRAWINGS

In the accompanying drawings.

DETAILED DESCRIPTION OF THE INVENTION

Figure 1:
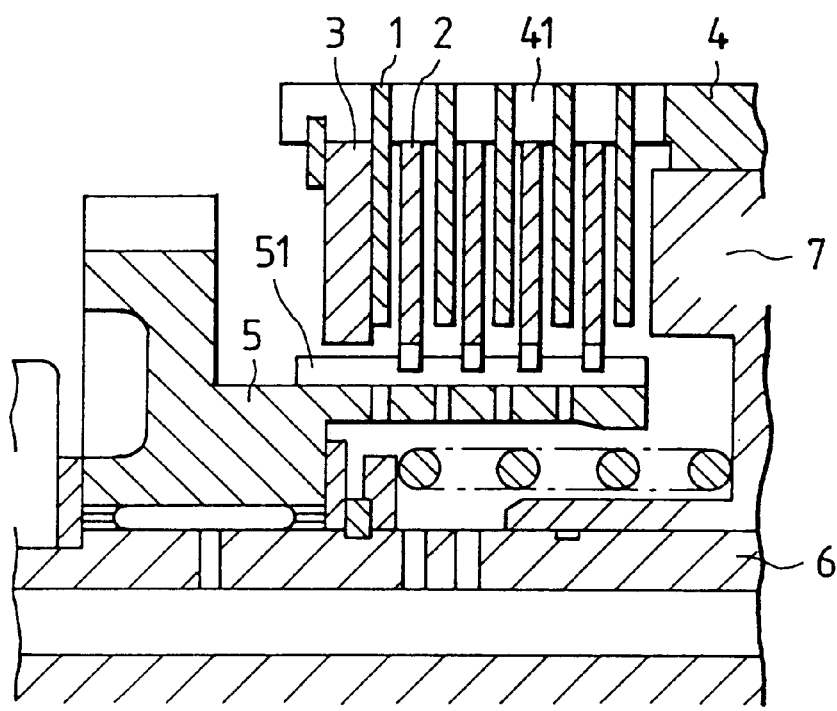
FIG. 1 is a side cross section showing an example of the wet friction material engagement device.

Detailed description of the present invention will be described as follows referring to the accompanying drawings.

A method of producing a wet friction material according to the present invention is applied to a wet friction material including a fibrous base material, a filler, a friction adjusting agent and thermosetting resin. The wet friction material being formed to be porous in its inside. In the method, a material having a characteristic of being soluble into water, such as, polyvinyl alcohol, a copolymer of vinyl acetate and maleic anhydride, polyvinyl methyl ether, polyacrylate, water soluble polyacrylic ester, polyethylene oxide, or the like, is dispersed in the inside of a raw paper in the form of particles, powder, or fibers. Then, the raw paper is passed through water so that the soluble material is dissolved so as to provide porosity. Thereafter, the raw paper is immersed with thermosetting resin as a binder, and heated and hardened, thereby producing the wet friction material.

In the present invention, the fibrous base material is natural pulp fiber or organic synthetic fiber which is similar to conventional ones. Further, the filler and the friction material used in the present invention are also similar to the conventional ones. For example, the filler is diatomaceous earth, clay, wollastonite, silica, carbonate and the like, and the friction material is cashew resin, resin particle, rubber particle, graphite, cokes, mica and the like. The filler is a particle material which contributes to the elasticity of the friction material. On the other hand, the friction adjustment material contribute to the properties of the friction material. The thermosetting resin, which is used as a binder, is commonly used as material which forms a wet friction material (composite fibrous paper). The resin of this type is phenol resin, epoxy resin, urea resin, melamine resin, silicon resin, or the like.

For example, in the case of thin paper which is low in mechanical strength, entanglement between fibrous base materials is weakened in order to provide porosity, so that the tensile strength of the friction material becomes low. Since a large quantity of water is contained in the inside of the friction material in the initial papermaking process, the tensile strength of the friction material is extremely lowered in this process in comparison with the pressed and dried state in the final process. Accordingly, the friction material is apt to be broken in the intermediate process (dehydrating, pressing, etc.). Therefore, there has been a limit in design to obtain the porosity of the friction material in view of the problem of reduction of the strength.

However, by dispersion of a water soluble material represented by polyvinyl alcohol in the inside of a raw paper, it becomes possible to perform the papermaking process in the state where the same strength as the conventional one is maintained even if the entanglement is weakened, because of the existence of polyvinyl alcohol or the like.

Thereafter, in the succeeding process, the friction material is passed through an impregnation cell filled with water or the like so that the water soluble material is dissolved to thereby make the porous raw material. There is no such problem of tensile strength that has been caused in the conventional case, because sufficient strength can be obtained by pressing in the final part of the papermaking process. After papermaking process, the raw paper is immersed with the themosetting resin as a binder, and heated and hardened so that a wet friction material is produced.

Further, when the raw paper has sufficient thickness or has such a composition that the fiber strength is satisfactory even if the raw paper is made porous, it is possible to provide the impregnation cell in the midway of the papermaking process.

Moreover, obtaining porosity is a matter of antinomy of the heat-resisting and durable property and the mechanical strength. Accordingly, it is possible that gradient is provided in the distribution of the water soluble material in the inside of the friction material (raw paper) so as to provide porosity only in the front surface layer, or, provide porosity so as to be gradually reduced from the front surface layer to the rear surface layer to thereby prevent the mechanical strength from being extremely reduced so that a large quantity of oil can be contained as a whole.

It is preferable that pores are formed in the front surface layer so as to remove rapidly-generated heat in a device such as a clutch or the like which is abruptly pressed. On the other hand, it is preferable that pores are scattered in the whole layer to increase the total quantity of oil, for example, in the case of sliding contact where time is long while the sliding speed is slow.

Embodiments of the present invention will be described.

Figure 2:
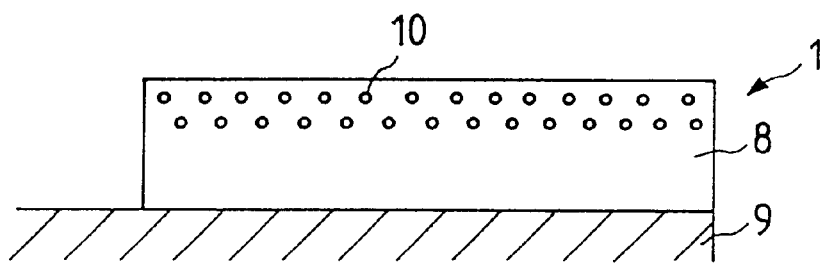
FIG. 2 is an explanatory diagram showing an example of the porosity.
Figure 3:
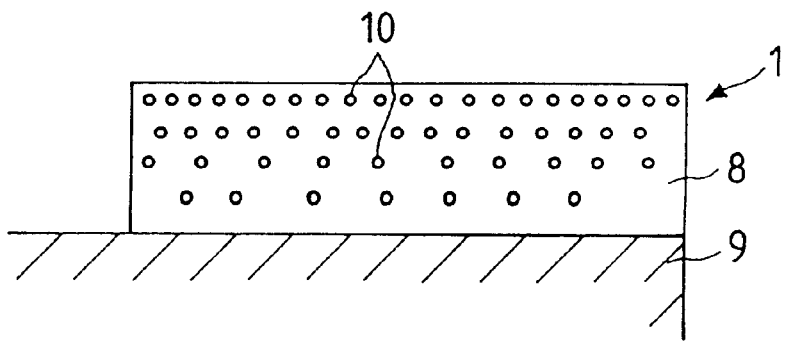
FIG. 3 is an explanatory diagram showing another example of the porosity.

FIG. 2 shows an example in which a large number of pores 10 are formed in the vicinity of the front surface layer of a friction material 8 to be stuck on the surface of a core plate of a driven plate 1. In this case, when the friction material is produced, a large number of the water soluble material is distributed in the vicinity of the front surface layer of the friction material 8. FIG. 3 shows an example in which pores 10 are distributed in the whole friction material 8 in the same manner as in the foregoing case and the porosity is gradually reduced from the front surface layer to the rear surface layer to thereby provide a gradient function. In this case, when the friction material is produced, the water soluble material is distributed to gradually reduced from the front surface layer to the rear surface layer.

Figure 4:
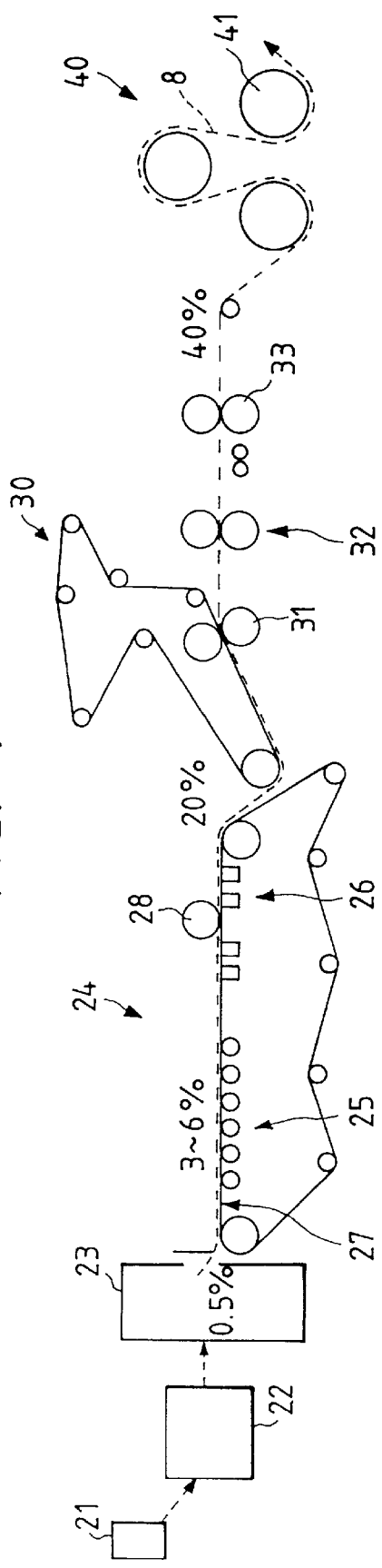
FIG. 4 is a diagram for explaining the papermaking process of the friction material.

FIG. 4 is a diagram for explaining the papermaking process. In the drawing, a density adjusting agent 21, a screen (impurity remover) 22, and a flow box 23 are illustrated in the order from the left side. The numerical value of 0.5% shown in the drawing means that the contents of the water and a raw paper impregnated with a water soluble material are 99.5% and 0.5% at the flow box 23, respectively.

Water soluble materials are different in water-soluble temperature from each other. For example, polyvinyl alcohol is dissolved in hot water while polyvinyl methyl ester is dissolved in water not higher than 32.5° C. Therefore, the temperature of the water in the flow box is determined in accordance with the property of the impregnated water soluble material.

The reference numeral 24 designates a wire part of formation structure; 25, table rolls; 26, suction boxes; 27, wire netting; and 28, feed rolls. The wire netting with mesh of 60–90 is used. Water is removed by 3–6% here and further removed by 20% at a right end outlet. That is, water is reduced to 80%. The reference numeral 39 designates a press part constituted by a first press 31, a second press 32, and a third press 33. Water is removed by 40% at the right end. The reference numeral 40 designates a dryer part constituted by drying rolls 41. A dotted line 8 shows a raw paper to be fed.

Figure 5:
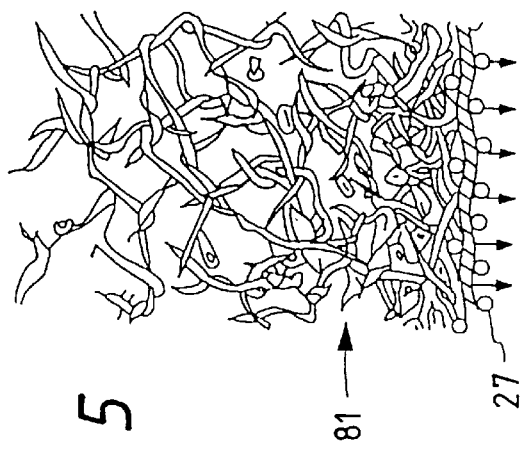
FIG. 5 is a diagram for schematically showing formation of a friction material on wire netting in the beginning of the papermaking process.

FIG. 5 shows a state of the raw paper to be formed on the wire netting 27. In the drawing, the reference numeral 81 designates a fibrous base material. Water is filtrated through the wire netting 27 so as to be removed downward as shown by arrows.

Figure 6:
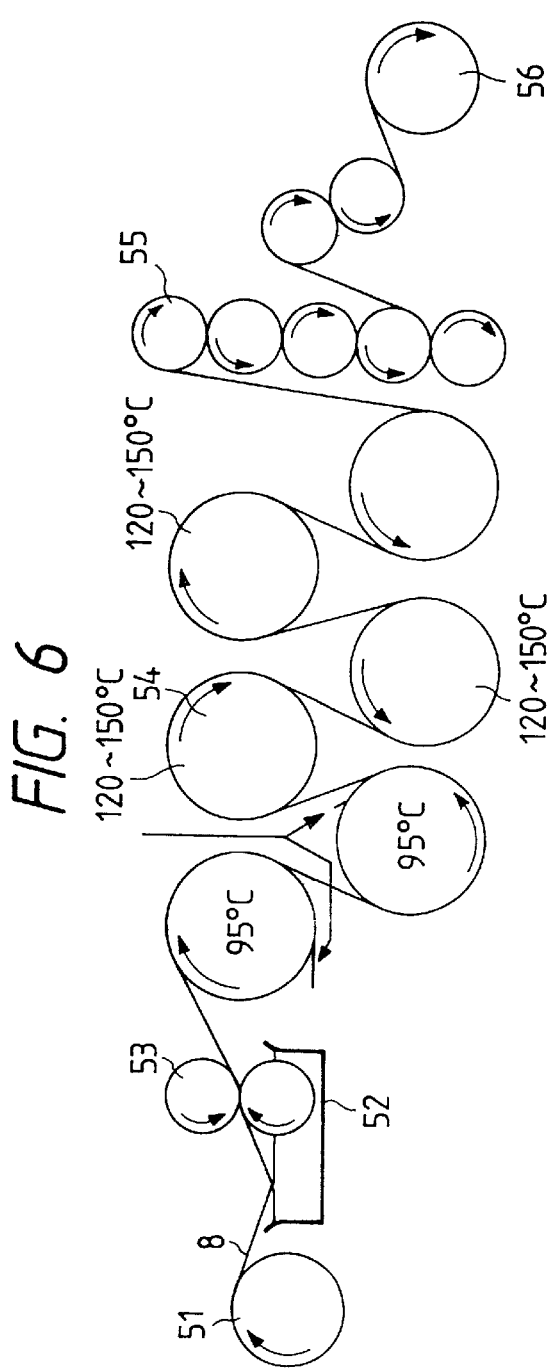
FIG. 6 is a diagram for explaining an embodiment of the producing process.

FIG. 6 shows an embodiment of the finishing process. The raw paper 8 made into paper in the papermaking process shown in FIG. 4 is fed from a paper winding roll 51 on which the raw paper 8 is wound, and passed through an impregnation cell 52 so that the contained water-soluble material is dissolved to form pores to thereby provide porosity. The temperature of the water in the impregnation cell may be selected suitably in accordance with the kind of the water soluble material as described above. Hot water is used when the contained material is, for example, polyvinyl alcohol while water not higher than 32.5° C. is used when the contained material is polyvinyl methyl ether. The reference numeral 53 designates pressing rolls; 54, drying drums; 55, calendars; and 56, a final winding-up drum (the value of the temperature in the drum is an example and therefore this is not related to the present invention).

Figure 7D:
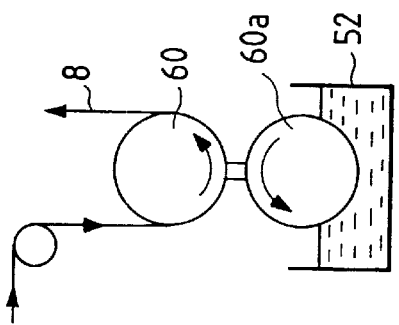
FIGS. 7A to 7D are diagrams for explaining various examples of the impregnation cell.
Figure 7C:
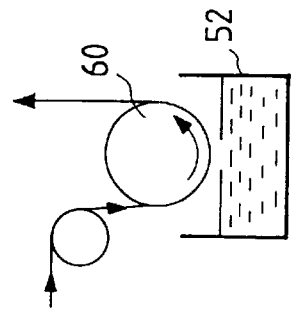
Figure 7B:
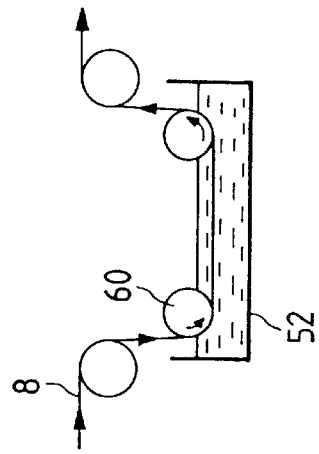
Figure 7A:
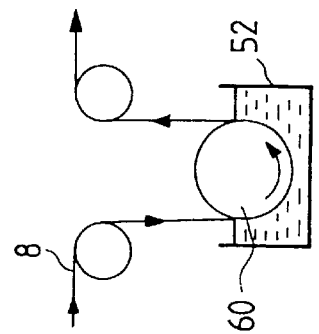

FIGS. 7A to 7D shows various shapes of the impregnation cell 52. FIG. 7A shows the case where the friction material is passed in the cell through an impregnation roll 60; FIG. 7B shows the case where two rolls 60 are provided and the friction material is passed therebetween; FIG. 7C shows the case where rolls 60 are provided just above the level of water and water is absorbed so as to deposit on the raw paper 8; and FIG. 7D shows the case where an impregnation roll 60a is partially put in water and a roll 60 is provided just above the roll 60a so that water deposits onto the raw paper 8 through the roll 60a.

Thereafter, thus produced raw paper is immersed with thermosetting resin, and heated and hardened to thereby produce the wet frictional material.

What is claimed is:

1. A method of producing a wet friction material comprising the steps of:
   dispersing a water soluble material into a raw paper including a fibrous base material, a filler, and a friction adjusting agent;
   passing said raw paper through water to dissolve said water soluble material to provide porosity;
   immersing said raw paper with thermosetting resin; and
   heating and hardening said raw paper to form a wet friction material.

2. A method of producing a wet friction material according to claim 1, wherein a content distribution state of said water soluble material inside of said water soluble material is changed to adjust the distribution state of the porosity.

3. A method of producing a wet friction material according to claim 1, wherein said water soluble material is an organic polymer.

4. A method of producing a wet friction material according to claim 3, wherein said water soluble material is at least one of polyvinyl alcohol, a copolymer of vinyl acetate and maleic anhydride, polyvinyl methyl ether, polyacrylate, water soluble polyacrylic ester, and polyethylene oxide.

5. A method of producing a wet friction material according to claim 1, wherein said water soluble material is dispersed in the inside of said friction material in the form of at least one of particles, powder, and fibers.

6. A method of producing a wet friction material according to claim 2, wherein a large amount of said water soluble material is distributed in the vicinity of a front surface layer of said wet friction material.

7. A method of producing a wet friction material according to claim 6, wherein said water soluble material is distributed so as to be gradually reduced from the front surface layer to a rear surface layer thereof.

* * * * *